(12) United States Patent
Yoshimura et al.

(10) Patent No.: US 8,495,569 B2
(45) Date of Patent: Jul. 23, 2013

(54) SOFTWARE ANALYZING APPARATUS FOR ANALYZING SOFTWARE COMPONENTS AND CORRELATIONS BETWEEN SOFTWARE COMPONENTS

(75) Inventors: Kentaro Yoshimura, Hitachi (JP); Fumio Narisawa, Hitachinaka (JP); Yuichiro Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 873 days.

(21) Appl. No.: 12/612,371

(22) Filed: Nov. 4, 2009

(65) Prior Publication Data

US 2010/0115492 A1    May 6, 2010

(30) Foreign Application Priority Data

Nov. 5, 2008   (JP) ................. 2008-284137

(51) Int. Cl.
  *G06F 9/44*    (2006.01)
  *G06F 9/445*   (2006.01)
(52) U.S. Cl.
  USPC .......................................... 717/120; 717/121
(58) Field of Classification Search
  None
  See application file for complete search history.

(56) References Cited

U.S. PATENT DOCUMENTS

| | | | |
|---|---|---|---|
| 4,864,569 A * | 9/1989 | DeLucia et al. | 714/38.1 |
| 5,361,355 A * | 11/1994 | Kondo et al. | 717/120 |
| 5,845,119 A | 12/1998 | Kozuka et al. | |
| 2009/0089753 A1 * | 4/2009 | Yoshimura et al. | 717/121 |

FOREIGN PATENT DOCUMENTS

| | | |
|---|---|---|
| JP | 8-286901 A | 11/1996 |
| JP | 9-134282 A | 5/1997 |
| JP | 2009-86791 A | 4/2009 |

* cited by examiner

*Primary Examiner* — Hyun Nam
(74) *Attorney, Agent, or Firm* — Crowell & Moring LLP

(57) ABSTRACT

The present invention provides a software analyzer supporting development of derived products by allowing efficient selection of software components to be simultaneously reutilized or changed based on the past record of developments and changes of software products. A software analyzer according to the present invention analyzes a plurality of software components included in existing software products and correlations between the plurality of software components. The software analyzer includes product line analysis means adapted to create product line configuration data numerically expressing a set of the plurality of software components included in the existing software products, from existing product configuration data including, for each of the existing software products, data on the plurality of software components and data on the correlations between the plurality of software components, inter-component distance analysis means adapted to calculate inter-software-component distances numerically quantifying the correlations between the software components based on the product line configuration data, component cluster analysis means adapted to group the software components based on the inter-software-component distances, and an output section outputting results obtained by the product line analysis means, the inter-component distance analysis means, and the component cluster analysis means.

11 Claims, 13 Drawing Sheets

| Product name | A | B | C | D |
|---|---|---|---|---|
| Base | - | A | B | B |
| a | 1.0 | 2.0 | 2.1 | 3.0 |
| b | 1.0 | 2.0 | - | 3.0 |
| c | 1.0 | 2.0 | 2.1 | 3.0 |
| d | - | 1.0 | 1.0 | - |
| e | 1.0 | - | - | 1.0 |
| f | - | - | 1.0 | - |

212

| | A | B | C | D |
|---|---|---|---|---|
| a | 1 | 1 | 1 | 1 |
| b | 1 | 1 | 0 | 1 |
| c | 1 | 1 | 1 | 1 |
| d | 0 | 1 | 1 | 0 |
| e | 1 | 0 | 0 | 1 |
| f | 0 | 0 | 1 | 0 |

2321

SOFTWARE ANALYZING APPARATUS FOR ANALYZING SOFTWARE COMPONENTS AND CORRELATIONS BETWEEN SOFTWARE COMPONENTS

BACKGROUND OF THE INVENTION

1. Field of the Invention

The present invention relates to a software analyzer analyzing developed software.

2. Background Art

In a development situation where, for example, new software is to be developed or a new version of existing software is to be provided, a well-known software analysis technique is used which reutilizes software components collected from developed software.

The software analysis technique is applied to what is called embedded software embedded in an automobile or a device such as a cellular phone to control an object. Control based on such embedded software has the advantages of being more flexible and advanced than a conventional control scheme based on a mechanic mechanism or an electric circuit and allowing many derived products to be developed by partly changing the software.

In the prior art, software was developed for each object product or differential software was developed based on similar products. However, with expansion of the application range of embedded software, the number of derived products and the scale of software have increased. Thus, significant improvement of development efficiency has been demanded. In particular, there has been much demand for an increase in the efficiency of reutilization type development and differential change type development in the development of derived products.

As a technique for meeting the above-described demand, for example, JP Patent Publication (Kokai) No. 8-286901A (1996) discloses the technique of arranging components for constructing design data composed of a plurality of parts, in a layered structure, and adding related data such as description data or the contents to the components so that simulation can be performed on each of the components.

Furthermore, JP Patent Publication (Kokai) No. 9-134282A (1997) discloses the technique of analyzing interfaces for software components based on source codes to analyze the dependence of each software component on another; the technique is implemented as a software analyzer.

SUMMARY OF THE INVENTION

However, in connection with the reutilization on a software component basis, JP Patent Publication (Kokai) No. 8-286901A (1996) is insufficient for large-scale software with more than several thousand software components.

In general, dividing software into a number of components is effective for allowing development processes to be executed in parallel and improving reusability. On the other hand, this disadvantageously exponentially increases the number of sets of software components. For example, if a software product is composed of 20 software components, then even for only the selection of whether or not to utilize each of the software components, the number of sets exceeds one million. For vehicle control software and the like the scale of which has been increasing, the number of software components may exceed one thousand. The number of sets of these software components is enormous. Thus, it is impossible to determine all the sets of the software components for development of derived products.

Furthermore, JP Patent Publication (Kokai) No. 9-134282A (1997) fails to allow the analysis of the correlations among software components which does not involve an interface dependence relationship but to be simultaneously utilized or changed.

For example, automobile control software is layered in many stages including a control application, middleware, and basic software. Thus, control application software components using a CAN (Control Area Network) communication system are first connected to CAN communication software components via middleware software components. In this case, the control application software components have no direct interface dependence relationship with the CAN communication software components. However, if the control application software components are reutilized, the CAN communication software components also need to be reutilized.

The present invention has been made in view of these circumstances. An object of the present invention is to provide a software analyzer supporting development of derived products by allowing efficient selection of software components to be simultaneously reutilized or changed based on the past record of developments and changes of software products.

To accomplish the above-described object, the present invention analyzes, based on configuration data on existing products, simultaneous utilization relationships and simultaneous change relationships among software components to quantitatively evaluate the correlations among the plurality of software components, and automatically groups software components likely to be simultaneously utilized or changed for development of derived products.

That is, the present invention provides a software analyzer analyzing a plurality of software components included in existing software products and correlations between the plurality of software components, the software analyzer including product line analysis means adapted to create product line configuration data numerically expressing a set of the plurality of software components included in the existing software products, from existing product configuration data including, for each of the existing software products, data on the plurality of software components and data on the correlations between the plurality of software components, inter-component distance analysis means adapted to calculate inter-software-component distances numerically quantifying the correlations between the software components based on the product line configuration data, component cluster analysis means adapted to group the software components based on the inter-software-component distances, and an output section outputting results obtained by the product line analysis means, the inter-component distance analysis means, and the component cluster analysis means.

In this case, the software analyzer may further include software component selection means adapted to acquire, from the plurality of software components, data on the software components and version data on the software components and select software component candidates, a to-be-utilized software component repository section storing a software component included in the software component candidates displayed by the output section and selected by a user, software component retrieval means, based on the inter-software-component distance, retrieving a software component likely, to be used together with the software component selected by the user, as a recommended software component, and a recommended software component repository section storing the recommended software component, wherein the output section may further output results from the software component selection means, the to-be-utilized software component repository section, and the recommended software component repository section.

The present invention thus allows efficient selection of software components to be simultaneously reutilized or changed for development of derived products based on the past record of developments and changes of software products.

Furthermore, the present invention enables the number of sets of software components to be reduced.

DESCRIPTION OF SYMBOLS

Figure 1:
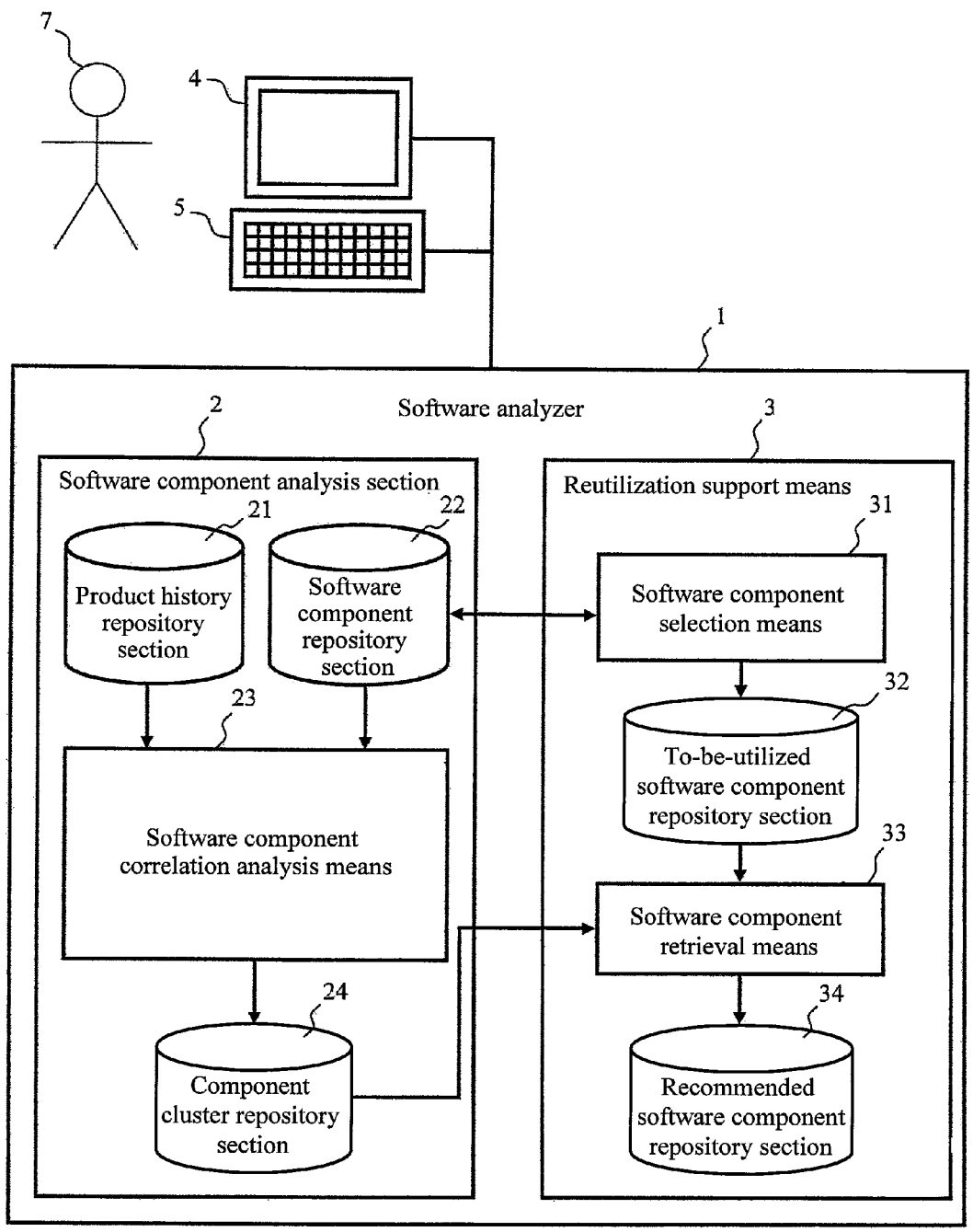
FIG. 1 is a diagram showing an example of the configuration of a software analyzer according to an embodiment of the present invention.

1 . . . Software analysis section, 2 . . . Software component analysis means, 3 . . . Reutilization support means, 4 . . . Display device, 5 . . . Input device, 6 . . . Engine control software, 7 . . . User, 21 . . . Product history repository section, 22 . . . Software component repository section, 23 . . . Software component correlation analysis means, 24 . . . Component cluster repository section, 31 . . . Software component selection means, 32 . . . To-be-utilized software component repository section, 33 . . . Software component retrieval means, 34 . . . Recommended software component repository section, 231 . . . Product line analysis means, 232 . . . Product line repository section, 233 . . . Inter-component distance analysis means, 234 . . . Inter-component distance repository section, 235 . . . Component cluster analysis means

DETAILED DESCRIPTION OF THE PREFERRED EMBODIMENT

The present invention relates to a software analyzer which, based on configuration data on existing products, analyzes simultaneous utilization relationships and simultaneous change relationships among software components to quantitatively evaluate the correlations among the plurality of software components, and automatically groups software components likely to be simultaneously utilized or changed for development of derived products.

An embodiment of the present invention will be described with reference to the attached drawings. However, it should be noted that the present embodiment is only an example in which the present invention is implemented and does not limit the technical scope of the present invention. Furthermore, components that are common throughout the drawings are denoted by the same reference numerals.

<General Configuration and Operation of the Software Analyzer>

FIG. 1 shows a general configuration of a software analyzer according to the embodiment of the present invention. The software analyzer according to the present embodiment includes a software analysis section 1, a display device 4, and an input device 5. The software analysis section 1 includes software component analysis means 2 and reutilization support means 3. Furthermore, the software component analysis means 2 includes a product history repository section 21, a software component repository section 22, software component correlation analysis means 23, and a component cluster repository section 24. The reutilization support means 3 includes software component selection means 31, a to-be-utilized software component repository section 32, software component retrieval means 33, and a recommended software component repository section 34.

Now, the operations of the means included in the software analyzer shown in FIG. 1 will be described.

The software component analysis means 2 analyzes the correlations among existing software components. The reutilization support means 3 recommends software components likely to be simultaneously reutilized and changed, to a user 7.

The product history repository section 21 stores configuration data on already released existing software products. The software component repository section 22 stores developed existing software components. Based on the configuration data on the existing software products stored in the product history repository section 21 and the existing software components stored in the software component repository section 22, the software component correlation analysis means 23 performs conversion into the correlations among the software components in the development history of the existing software products. The component cluster repository section 24 stores the correlations among the software components resulting from the conversion by the software component correlation analysis means 23.

The software component selection means 31 uses the software component repository section 22 to provide the user 7, through the display device 4 and the input device 5, with means adapted to select software components to be reutilized and changed for development of a new derived product. The to-be-utilized software component repository section 32 stores to-be-reutilized and to-be-changed software components selected by the user 7 via the software component selection means 31. The software component retrieval means 33 uses the to-be-reutilized and to-be-changed software components stored in the to-be-utilized software component repository section 32 to retrieve software components frequently subjected to simultaneous reutilization and change, based on the inter-software-component correlations stored in the component cluster repository section 24. The software component retrieval means 33 thus extracts the recommended software components. The recommended software component repository section 34 stores the recommended software components extracted by the software component retrieval means 33.

<Software Component Analysis Means>

The software component analysis means 2, a component of the software analysis section 1 according to the present invention, will be described.

The need for the present software component analysis means is based on the rule of thumb that the software components of an existing software product to be reutilized may have a mutual dependence relationship and are not always utilized independently. Such a dependence relationship will be described below with reference to FIG. 2.

Figure 2:
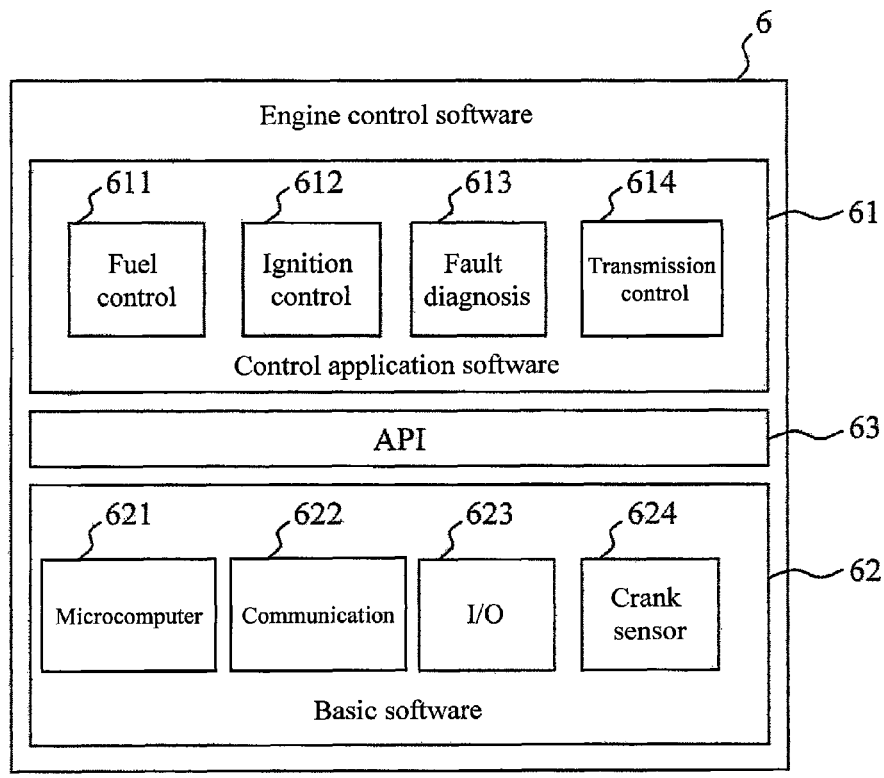
FIG. 2 is a diagram showing the configuration of engine control software.

As a specific example in which the software analysis section 1 according to the embodiment of the present invention is applied, automobile engine control software 6 is shown in FIG. 2. The engine control software 6 includes control application software 61, basic software 62, and an application program interface (API) 63. The control application software 61 includes a fuel control software component 611, an ignition control software component 612, a fault diagnosis software component 613, and a transmission control software component 614. The basic software 62 includes a microcomputer software component 621, a communication software component 622, an I/O software component 623, and a crank sensor software component 624.

Now, it is assumed that a derived product is developed based on the engine control software 6. For example, if 4-cylinder engine control software is changed to a 3-cylinder version, the ignition control software component 612 and I/O software component 623, for which processing varies depending on the number of cylinders, need to be simultaneously changed. Furthermore, the transmission control software component 614 is required for a vehicle with an automatic transmission. However, the transmission control software component 614 is unnecessary for a vehicle with a manual transmission.

Thus, when existing software is reutilized, a plurality of software components may need to be simultaneously changed or whether or not each software component may need to be utilized needs to be determined.

Figure 3:
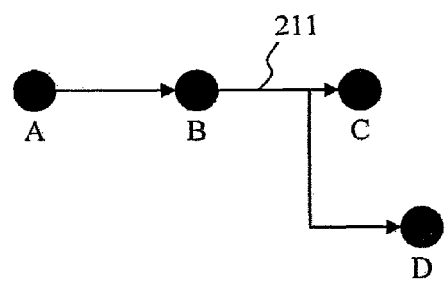
FIG. 3 is a diagram showing a development tree for a software product.

Furthermore, with reference to FIG. 2, an example of one product derived from one existing product has been described. However, in an actual development situation, complicated branching of reutilization occurs; a plurality of products may be derived from an original software product serving as a development base or the derived product may further be updated. FIG. 3 shows an example of a relationship for such a product to be developed. FIG. 3 shows a development tree 211 for software to which the software analysis section 1 according to the embodiment of the present invention is applied. Reference characters A, B, C, and D denote product releases. Arrows connecting the product releases together denote the flow of the development. For example, the figure shows that a product B is developed based on a product A. Furthermore, for embedded control software such as an engine control system, development operations on apparatus with different hardware configurations may be performed in parallel. Thus, both products C and D are developed based on the product B.

As described above, in a development situation in which a new product is developed by repeatedly reutilizing existing products, the next product is expected to be more efficiently developed by recording, for each existing product, whether or not the existing product has a software component to be utilized and whether or not each of the software components has been changed, and determining the correlations among the software components and duplicate software components.

Figure 4:
FIG. 4 is a diagram showing existing product configuration data stored in a product history repository section.

Thus, in view of the above-described development situation, existing product configuration data including component configuration and version data on existing products is required in order to allow development of a new product and improvement of an existing product to be more efficiently achieved. FIG. 4 shows existing product configuration data 212 according to the embodiment of the present invention. A column direction indicates existing products A, B, C, and D. A row direction indicates software components included in each of the products. In this example, the software components are of six types a, b, c, d, e, and f. Furthermore, version numbers of the software components are shown in the areas where each of the product names crosses each of the software component names. For example, the software component (c) in the product B is of a version 2.0. If a particular software component is not used in a particular product as is the case with the software component (b) in the product C, this is indicated by "-". The existing product configuration data is stored in the product history repository section 21. As is apparent from FIG. 4, if a derived product is manufactured from an existing product having a plurality of software components, then for more efficient development, it is necessary to analyze the utilization status of the software components of each existing product, software component version data, and software component change statuses, to determine, for example, software components likely to be simultaneously utilized or changed.

As described above, creation of existing product configuration data enables configuration data on various simultaneously-developed software products to be managed.

Processing executed by the software component analysis means 2 will be described below in detail; the processing involves automatically detecting and grouping software components to be simultaneously reutilized or changed for development of a new product based on the past developments and changes of existing products recorded in the existing product configuration data.

<Configuration of and Specific Processing by the Software Component Analysis Means>

Figure 5:
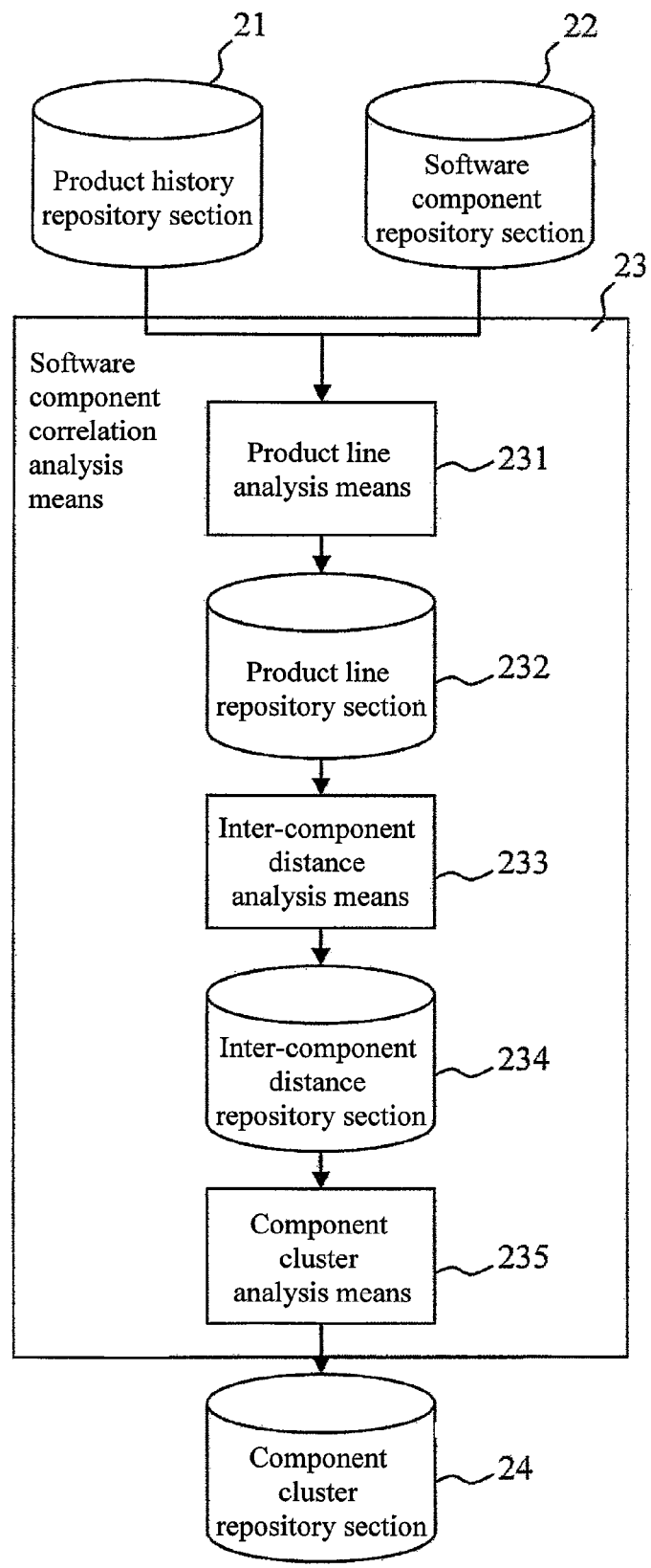
FIG. 5 is a diagram showing the configuration of software component analysis means.

FIG. 5 shows the configuration of the software component analysis means 2 according to the embodiment of the present invention in detail.

The software component analysis means 2 includes a product line repository section 21, a software component repository section 22, software component correlation analysis means 23, and a component cluster repository section 24.

The software component correlation analysis means 23 includes product line analysis means 231 for humerically converting configuration data on a product line, a product line repository section 232 storing configuration data numerically converted by the product line analysis means, inter-component distance analysis means 233 analyzing inter-software-component distances based on the product line configuration data numerically converted, an inter-component distance repository section 234 storing the inter-software-component distances, and component cluster analysis means 235 for grouping the software components based on the inter-software-component distances.

(Processing by the Product Line Analysis Means)

Figure 6:
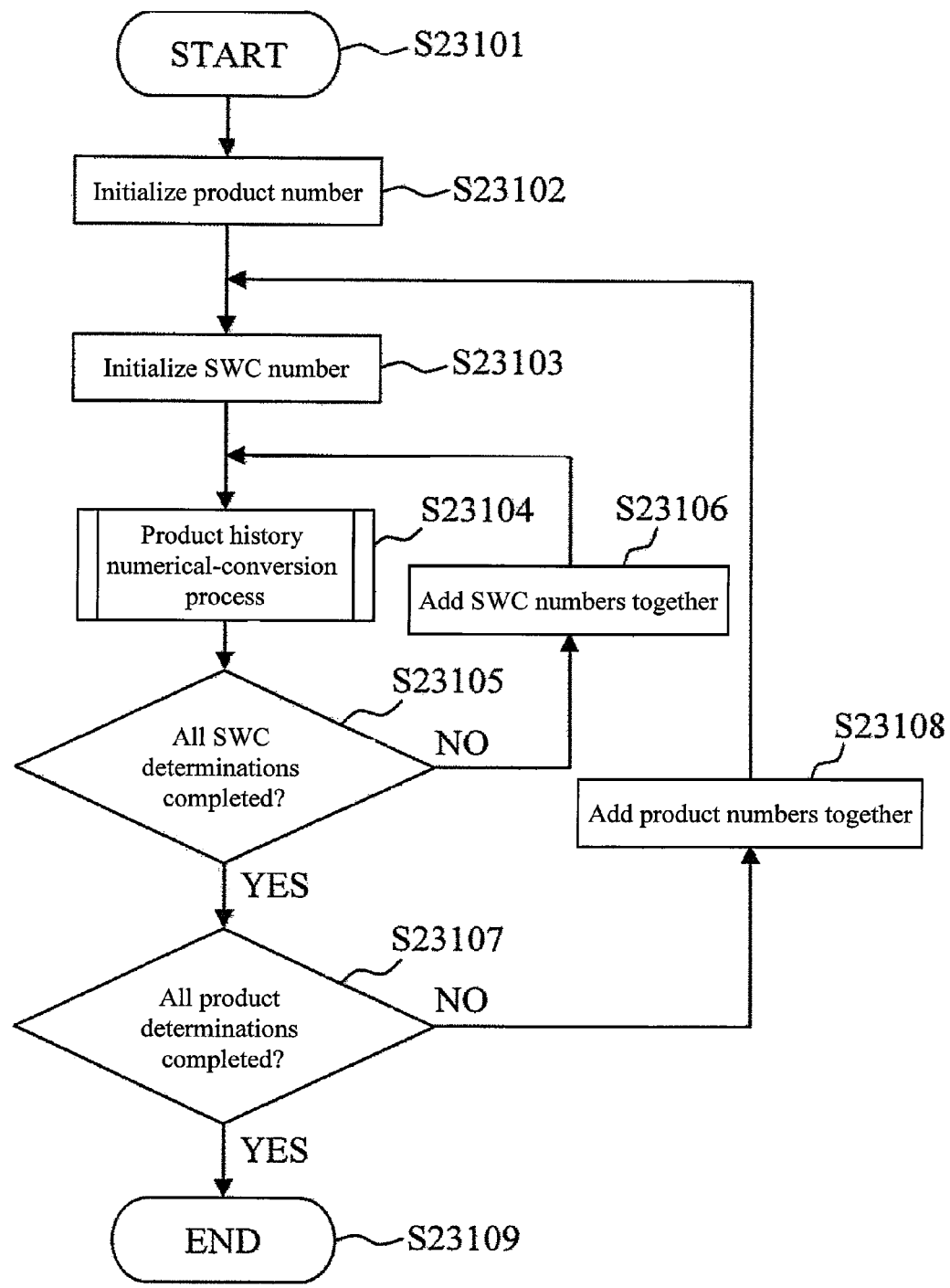
FIG. 6 is a flowchart showing processing executed by product line analysis means.

Processing executed by the product line analysis means 231, a component of the above-described software component analysis means 2, will be described. FIG. 6 is a flowchart showing a product line analysis process executed by the product line analysis means 231 according to the embodiment of the present invention. Here, based on the existing product configuration data stored in the product history repository section 21 and the data on the software components of the existing products stored in the software component repository section 22, the existing product configuration data is numerically converted in connection with the "whether or not each of the software components included in the existing product is utilized in any derived product" and "whether or not the software component has been changed". Thus, product line configuration data is created. The created product line configuration data is used for the next process, that is, correlation analysis based on numerical calculations.

The processing starts with step S23101. In step S23102, the product number of an existing product to be analyzed is initialized. The initial value obtained is then input. In step S23103, the number of a software component (SWC) to be analyzed is initialized. The initial value obtained is then input. In step S23104, the existing product history is numerically converted. The numerical-conversion process varies depending on whether the utilization status or change status of the software component is used. This will be described below in detail. Step S23105 determines whether or not the determination for all the software components has been completed. If the determination has not been completed, the processing proceeds to step S23106. If the determination has been completed, the processing proceeds to step S23107. In step S23106, the number of the software component is added, and the processing then proceeds to step S23104. Step S23107 determines whether or not the determination for all the products has been completed. If the determination has not been completed, the processing proceeds to step S23108. If the determination has been completed, the processing proceeds to step S23109. In step S23108, the product number is added, and the processing then proceeds to step S23103. In step S23109, the processing is completed. The thus created product line configuration data is stored in the product line repository section 232. The created product line configuration data is used for the next process, that is, correlation analysis based on numerical calculations.

Figures 7, 8:
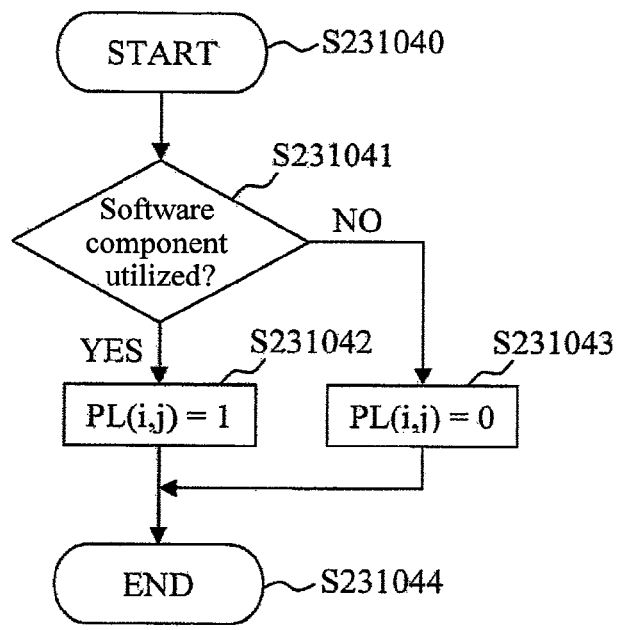
FIG. 7 is a flowchart showing a product history numerical-conversion process using a software component utilization status.
FIG. 8 is a diagram showing product line configuration data obtained using the software component utilization status.

Now, numerical conversion of data indicating whether or not the existing product utilizes each of the software components stored in the software component repository section 22 and utilized in the derived product will be described. FIG. 7 is a flowchart showing processing executed for numerical conversion using the utilization status of the software component in the product history numerical-conversion process in step S23104 described above. The processing starts with step S231041. Step S231042 determines whether or not the existing product to be analyzed utilizes each of the software components. If the existing product utilizes the software component, the processing proceeds to step S231043. If the existing product does not utilize the software component, the processing proceeds to step S231044. In step S231043, the existing product configuration data is numerically converted into "1". In step S231044, the existing product configuration data is numerically converted into "0". In step S231045, the processing is completed.

FIG. 8 shows product line configuration data 2321 created by the product line analysis process and the product history numerical-conversion process using the utilization status of the software component. For example, "1" is shown in the section of the software component (c) for the product B because the product B utilizes the software component (c).

Figures 9, 10:
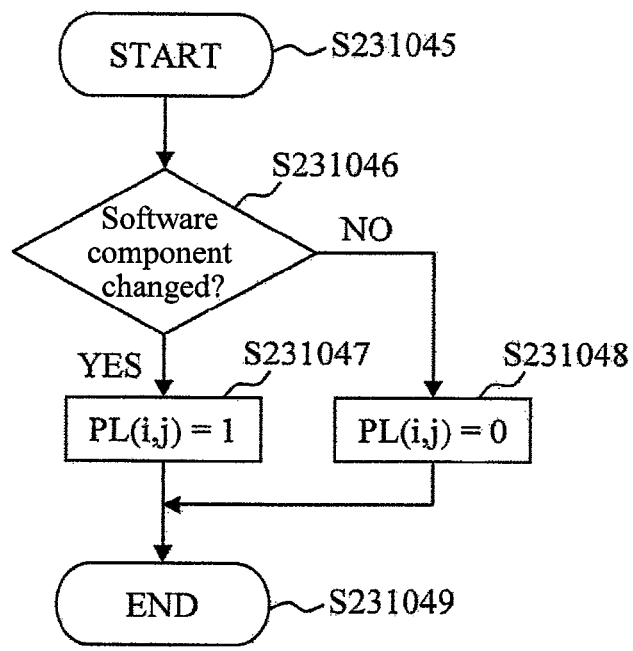
FIG. 9 is a flowchart showing a product history numerical-conversion process using a software component change status.
FIG. 10 is a diagram showing product line configuration data obtained using the software component change status.

Furthermore, numerical conversion of data indicating whether or not each of the software components stored in the software component repository section 22 and utilized in the derived product has been changed will be described. FIG. 9 is a flowchart showing processing executed for numerical conversion using the change status of the software component in the product history numerical-conversion process in step S23104 described above. The processing starts with step S231045. Step S231046 determines whether or not each of the software components has been changed in order to develop the derived product from the existing product. If the software component has been changed, the processing proceeds to step S231047. If the software component has not been changed, the processing proceeds to step S231048. In step S231047, the existing product configuration data is numerically converted into "1". In step S231048, the existing product configuration data is numerically converted into "0". In step S231049, the processing is completed.

FIG. 10 shows product line configuration data 2322 created by the product line analysis process and the product history numerical-conversion process using the change status of the software component. When a derived product is developed from the original product, if a software component used (or not used) in the original product is not used (or used) in the derived product and if a new version of a software component used in the original product is continuously used in the derived product, then the software component is considered to have been changed. For example, "1" is shown in the section of the software component (c) for the product B developed based on the product A (section AB in the figure) because the software component (c) has been changed.

As described above, product line configuration data is created based on the utilization status and change status of each of the software components included in each existing product. Thus, the existing product composed of the set of the different software components can be integrally and numerically handled.

(Processing by the Inter-Component Distance Analysis Means)

Figure 11:
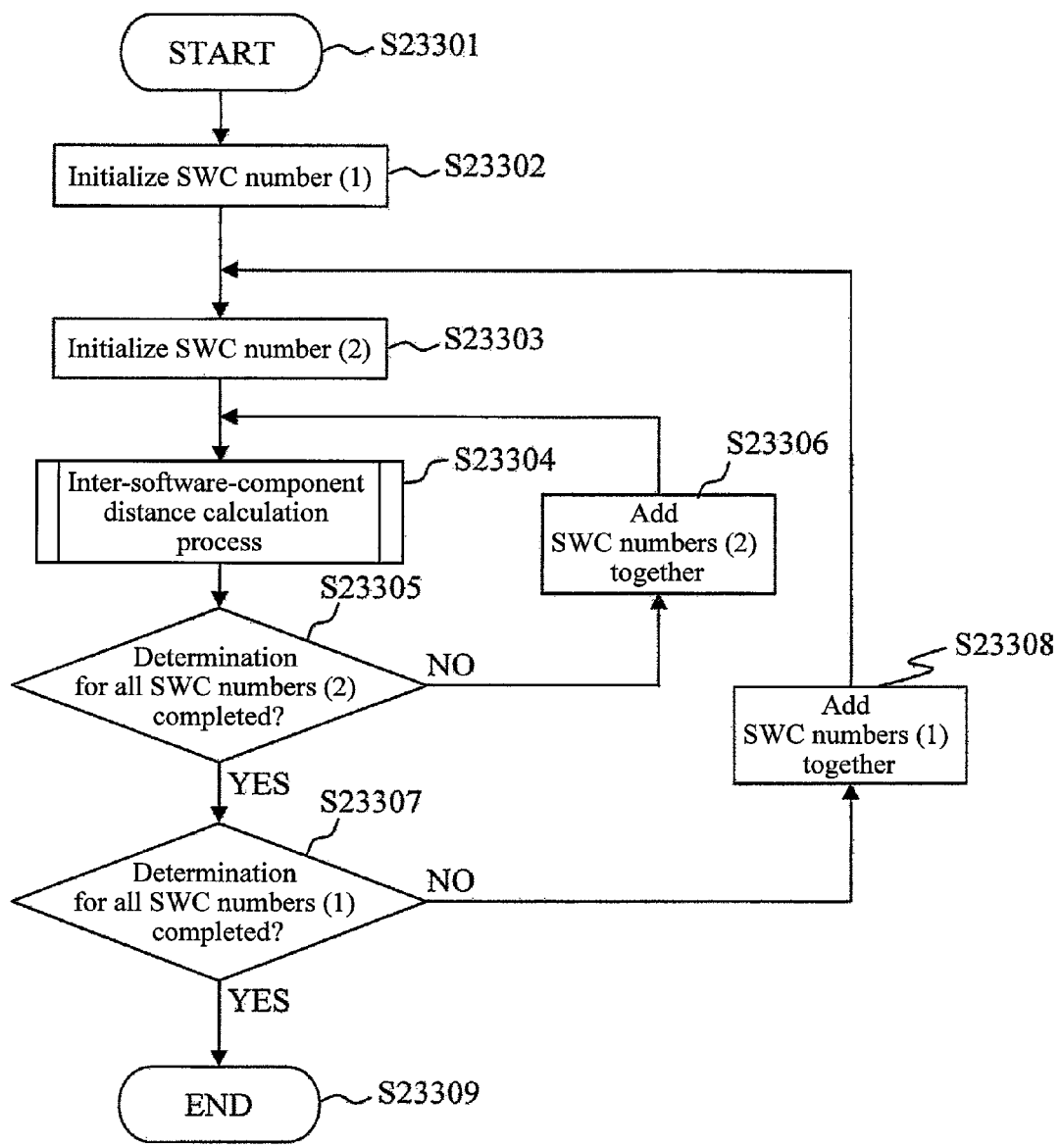
FIG. 11 is a flowchart showing processing executed by inter-component distance analysis means.

Now, processing executed by the inter-component distance analysis means 233, a component of the above-described software component analysis means 2, will be described. FIG. 11 is a flowchart showing the processing executed by the inter-component distance analysis means 233 according to the embodiment of the present invention. Here, based on the product line configuration data stored in the product line repository section 232, the inter-component distances between the software components included in the existing product are calculated. The determined inter-component distances are used for the next process, that is, grouping of the software components.

The processing starts with step S23301. In the present processing, the distance between two software components is sequentially analyzed. Thus, a software component (1) and a software component (2) are used in the processing. In step S23302, the number of the software component (1) is initialized. In step S23303, the number of the software component (2) is initialized. In step S23304, the distance between the software component (1) and the software component (2) is calculated. In this case, the processing varies depending on whether a Euclidean distance or an angle is used. This will be described below in detail. Step S23305 determines whether or not all the software components have been analyzed as the software components (2). If not all the software components have been analyzed, the processing proceeds to step S23306. If the analysis has been completed, the processing proceeds to step S23307. In step S23306, the number of the software component (2) is added. The processing then proceeds to step S23304. Step S23307 determines whether or not all the software components have been analyzed as the software component (1). If not all the software components have been analyzed, the processing proceeds to step S23308. If the analysis has been completed, the processing proceeds to step S23309. In step S23308, the number of the software component (1) is added. The processing then proceeds to step S23303. In step S23309, the processing is completed. The calculated inter-component distances are stored in the inter-component distance repository section 234. The determined inter-component distances are used for the next process, that is, grouping of the software components.

Figure 12:
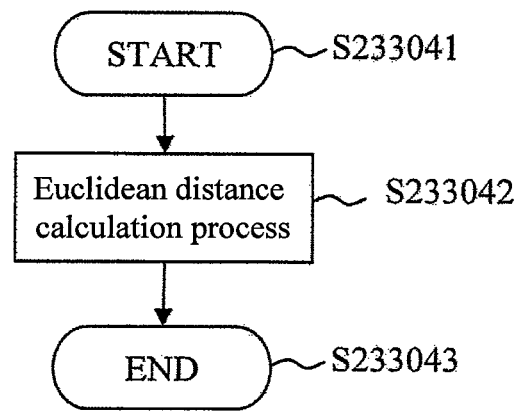
FIG. 12 is a flowchart showing processing executed by inter-component distance analysis means using a Euclidean distance.

Now, description will be given of the calculation, based on the Euclidean distance, of the distance between the software components stored in the software component repository section 22 and utilized in the derived product. FIG. 12 is a flowchart showing that the inter-component distance is calculated based on the Euclidean distance in step S23304 described above. The processing starts with step S233041. In step S231042, as the inter-component distance, a correlation based on the Euclidean distance is determined. A relevant computation expression is shown in (Expression 1). In step S233043, the processing is completed. Alternatively, instead of the Euclidean distance, a Manhattan distance may be used. A relevant computation expression is shown in (Expression 2). In the expressions, $SWC_1$ and $SWC_2$ denote a software component 1 and a software component 2. $Dist(SWC_1, SWC_2)$ denotes the distance between the software component 1 and the software component 2, and $swc_{1i}$ and $swc_{2i}$ denote numerically converted existing product configuration data (0 or 1) on the software components 1 and 2 for a product (i).

$$Dist(SWC_1, SWC_2) = \sqrt{\sum_i (swc_{1i} - swc_{2i})^2} \quad \text{(Expression 1)}$$

$$Dist(SWC_1, SWC_2) = \sum_i |swc_{1i} - swc_{2i}| \quad \text{(Expression 2)}$$

Figure 13:
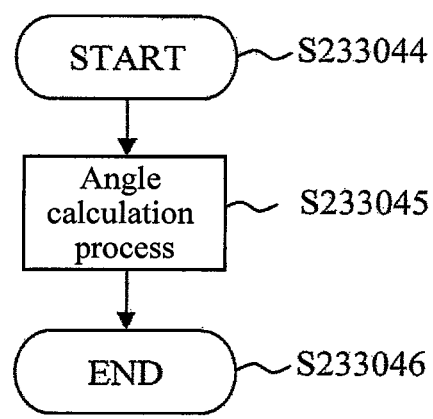
FIG. 13 is a flowchart showing processing executed by the inter-component distance analysis means using an angle.

Furthermore, description will be given of the calculation, based on the angle, of the distance between the software components stored in the software component repository section 22 and utilized in the derived product. FIG. 13 is a flowchart showing that the inter-component distance is calculated based on the angle in step S23304 described above. The processing starts with step S233044. In step S231045, as the inter-component distance, a correlation based on the angle is determined. A relevant computation expression is shown in (Expression 3). "•" in the expression denotes the inner product of a vector. In step S233046, the processing is completed.

$$Dist(SWC_1, SWC_2) = \cos^{-1}\left(\frac{SWC_1 \cdot SWC_2}{|SWC_1||SWC_2|}\right) \quad \text{(Expression 3)}$$

Figure 14:
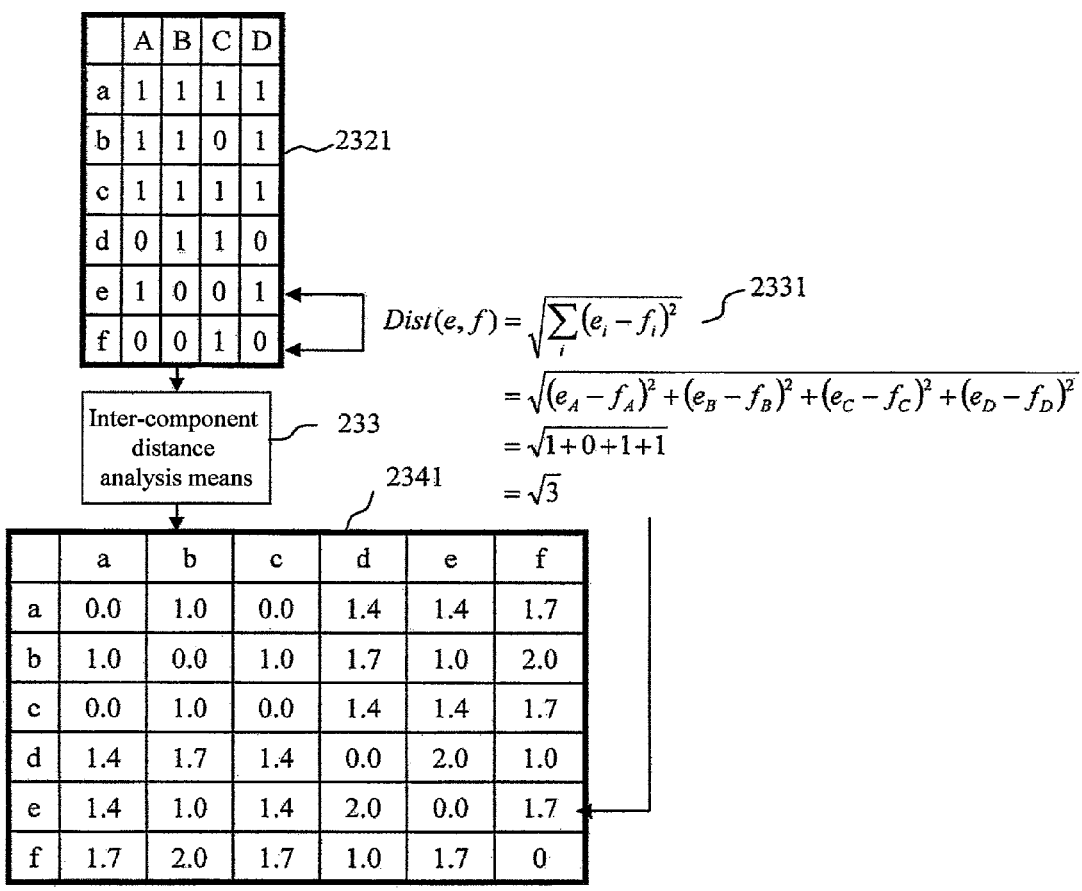
FIG. 14 is a diagram showing an inter-component distance calculation process using product line configuration data.

FIG. 14 shows the results of the calculation, in step S23304 described above, of the distance between the software components based on the Euclidean distance and the product line configuration data 2321 obtained using the utilization status of each of the software components included in the existing product. As shown in FIG. 14, the inter-software-component distance analysis means 233 uses the product line configuration data 2321 to calculate the distance, thus determining the inter-software-component distance 2341. An arithmetic expression 2331 is a distance expression for the distance between a software component (e) and a software component (f). As shown in the inter-software-component distance 2341 in FIG. 14, the distance between software components with exactly the same selection pattern is zero. If the selection pattern is different between the software components by only one product, the distance is 1. Furthermore, if the selection pattern is different between the software components by 100 products, the distance is 10.

Similarly, based on the product line configuration data 2322 obtained using the change status of each of the software components included in the existing product, the distance between the software components can be calculated. Alternatively, instead of the Euclidean distance, the Manhattan distance or the angle can be used to calculate the distance between the software components.

As described above, by numerically converting the correlation between the software components and using the concept of the distance, the correlation between the software components can be numerically quantified.

(Processing by the Component Cluster Analysis Means)

Figure 15:
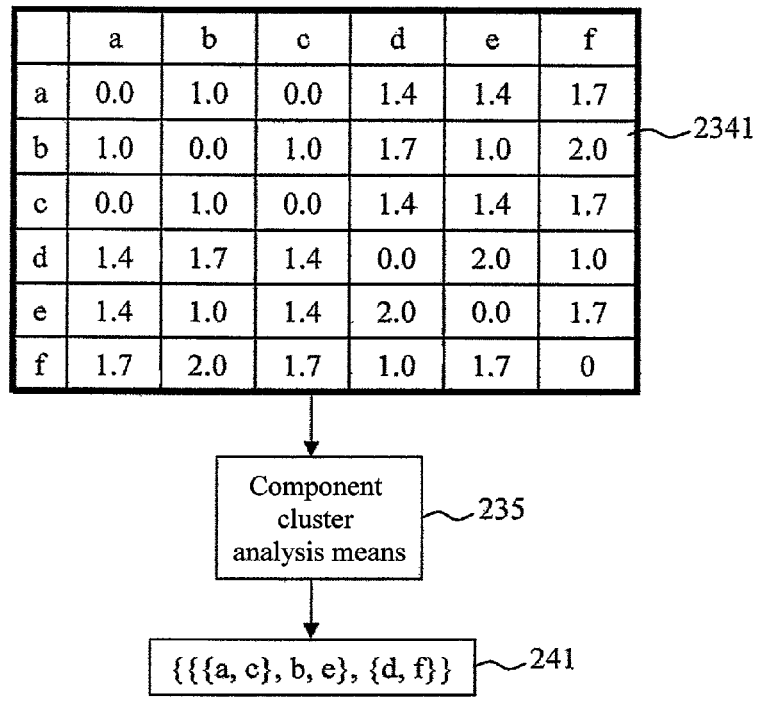
FIG. 15 is a diagram showing processing executed by component cluster analysis means.

Now, processing executed by the component cluster analysis means 235, a component of the above-described software component analysis means 2, will be described. FIG. 15 shows processing executed by the component cluster analysis means 235 according to the embodiment of the present invention. Here, based on the inter-software-component distance 2341 stored in the above-described inter-component distance repository section 234, a software component group 241 is determined. The thus determined software component group 241 is stored in the component cluster repository section 24. The created software component group 241 is presented to the user for support for the reutilization of the software components in the next process.

Figure 16:
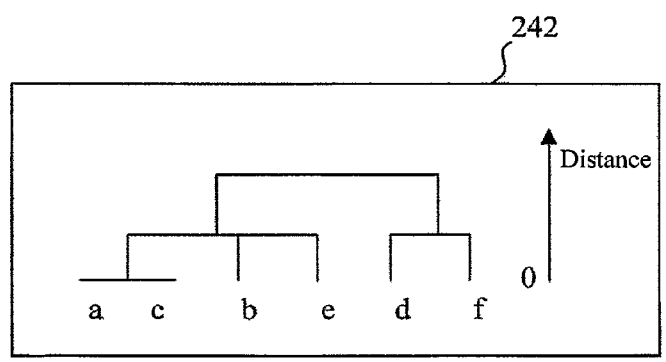
FIG. 16 is a tree diagram and showing the results of component cluster analysis.

Specifically, different software components with short distances between the software components are clustered for grouping. A technique for the clustering may be, for example, a nearest neighbor method, a furthest neighbor method, a median method, a centroid method, a group average method, a flexible method, or a ward method. In the software component group 241 in FIG. 15, the distance between the software components (a) and (c) is zero. Thus, the software components (a) and (c) form a group with a distance of zero. Furthermore, the distance between the software components (a) and (b) and the distance between the software components (b) and (e) are both 1. Thus, the software components (a), (b), and (e) form a group with a distance of 1. Additionally, the distance between the software components (d) and (f) is 1. Thus, the software components (d) and (f) form a group with a distance of 1. In addition, the above-described software component group 241, expressed in a tree diagram, is shown in FIG. 16.

As described above, based on the inter-software-component distance 2341 determined based on the existing product configuration data 2321 obtained using the software component utilization status, a plurality of software components is grouped. Then, the software component group 241 can be formed, which reflects the simultaneous utilization status of exiting products.

Similarly, based on the inter-software-component distance determined based on the existing product configuration data 2322 obtained using the software component change status, a plurality of software components is grouped. Then, a software component group (not shown in the drawings) can be formed which reflects the simultaneous change status of exiting products.

<Reutilization Support Means>

The reutilization support means 3, a component of the software analysis section 1 according to the present invention, will be described.

(Software Component Selection Means)

Figure 17:
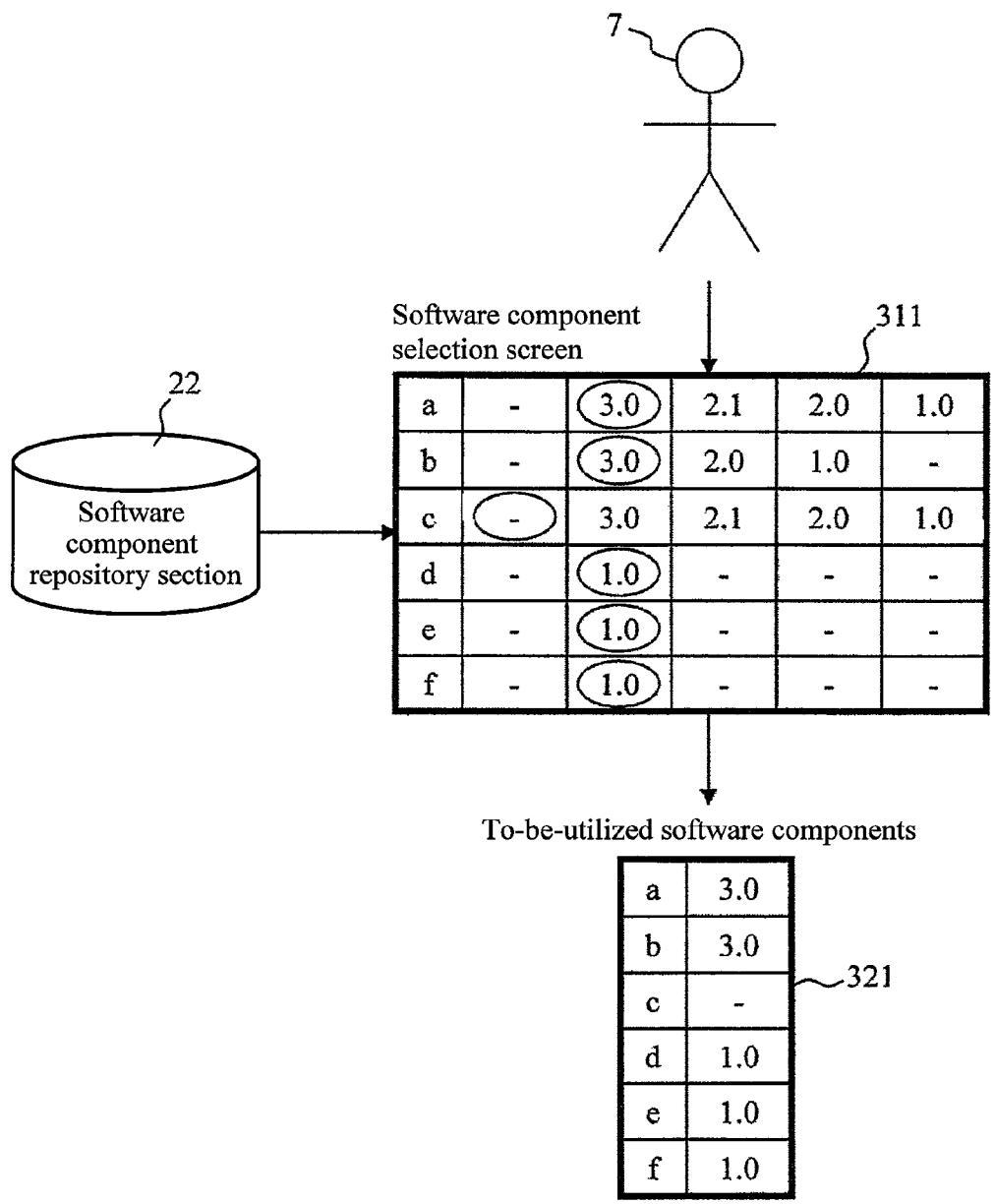
FIG. 17 is a diagram showing software component analysis means.

First, processing of the software component selection means 31, a component of the reutilization support means 3, will be described. FIG. 17 shows processing executed by the software component selection means 31 according to the embodiment of the present invention. The software component selection means 31 acquires existing software components and version data thereon from the software component repository section 22. The software component selection means 31 then displays, on the display device 4, a software component selection screen 311 serving as an operation screen for the software component selection means 31. During development of a new product, the user 7 selects software components to be utilized in the new product as well as the versions thereof from the displayed software component selection screen 311. In the example in FIG. 17, the user 7 selects the version 3.0 of the software components (a) and (b), and does not select the software component (c). The user 7 also selects the version 1.0 of the software components (d), (e), and (f). To-be-utilized software components 321 selected by the user are stored in the to-be-utilized software component repository section 32.

(Software Component Retrieval Means)

Figure 18:
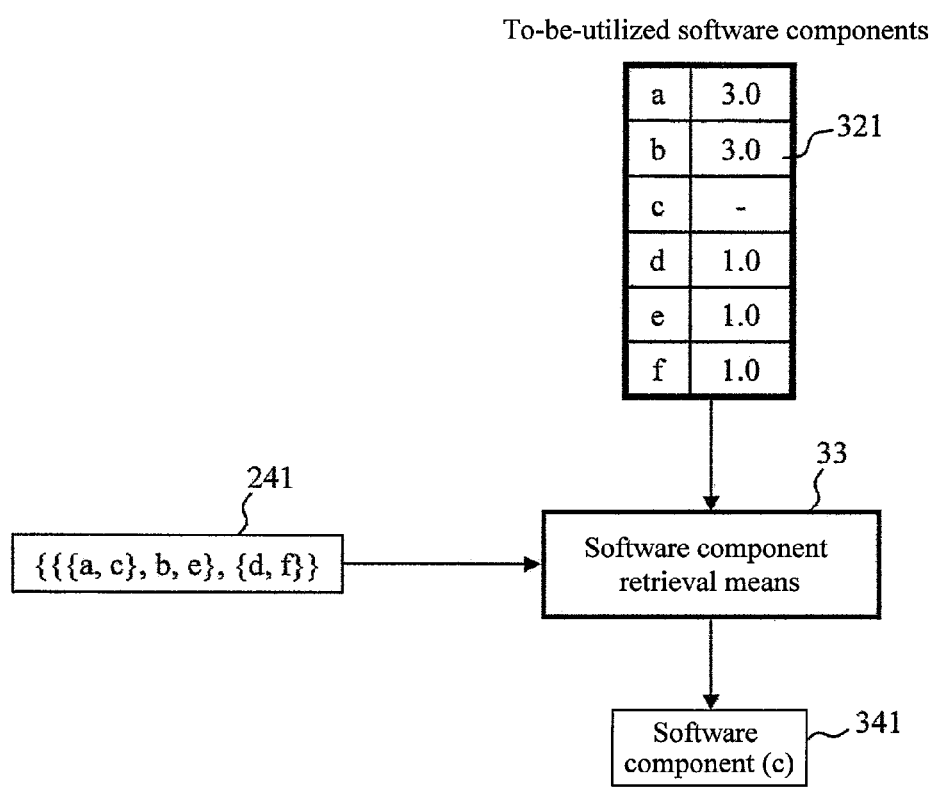
FIG. 18 is a diagram showing software component retrieval means.

Now, processing executed by the software component retrieval means 33, a component included in the above-described reutilization support means 3, will be described. FIG. 18 shows the processing executed by the software component retrieval means 33 according to the embodiment of the present invention. For the to-be-utilized software components registered in the to-be-utilized software components 321 stored in the to-be-utilized software component repository section 32, the software component retrieval means 33 analyzes the "group 241 of the software components reflecting the simultaneous utilization status of the existing products" and stored in the component cluster repository section 24. The software component retrieval means 33 thus extracts a to-be-utilized software component with an inter-component distance of at most a predetermined value. In the present embodiment, an inter-component distance of 0 is defined as a threshold. In the to-be-utilized software components 321, the software component (a) is registered. In the software component group 241, the software components (a) and (c) are registered as a group with a distance 0. Thus, the software component (c) is extracted as a to-be-simultaneously-utilized software component candidate 341.

Similarly, for the to-be-utilized software components registered in the to-be-utilized software components 321 stored in the to-be-utilized software component repository section 32, the software component retrieval means 33 analyzes the "group (not shown in the drawings) of the software components reflecting the simultaneous change status of the existing products" and stored in the component cluster repository section 24. The software component retrieval means 33 thus extracts a to-be-simultaneously-utilized software component candidate.

As described above, at the time of new product development, by referencing the distances between the software components of the existing products which may be simultaneously utilized and changed, those of the to-be-utilized software components 321 selected by the user which are likely to be simultaneously utilized can be presented to the user. Thus, the software component selection operation can be more efficiently performed.

<Summary>

The present invention is applicable to software products each composed of a plurality of software components. Applying the present invention to the software products allows the simultaneous utilization relationship and simultaneous change relationship of the software components to be analyzed based on the existing component configuration data. Thus, the correlations among the plurality of software components are quantitatively evaluated. In addition, the software components likely to be simultaneously utilized or changed for development of derived products are automatically grouped. Thus, the user can efficiently select the software components to be simultaneously reutilized or changed for development of derived products, based on the past record of developments and changes of the software products.

Furthermore, the software analyzer according to the embodiment of the present invention avoids the disadvantageous exponential increase in the number of sets of software components. First, the correlations among the software components are evaluated based on the development history of the existing products. Then, the individual, separate software components are formed into groups of software components likely to be simultaneously utilized or changed. Thus, combining the groups enables a reduction in the initial number of sets of software components.

Moreover, the present invention is applicable to software components included in vehicle control software. Specifically, the vehicle control software refers to power train control software controlling an engine and motors, chassis control software controlling a steering and a brake, and body control software controlling a door lock, a power window, and lighting.

For example, the power train control software is mounted in an electronic control device composed of microprocessors and LSIs. The power train control software receives data from a sensor (for example, a rotation number sensor) installed on the engine to estimate the operational status of the engine. The power train control software determines the target status of the engine based on the driver's operation. The power train control software then operates an actuator (for example, a throttle) required to achieve the target status. For the engine control system, even with the same engine type, the target status may vary depending on the type of the vehicle in which the system is mounted, or the sensor or actuator used may be changed depending on a production period. By applying the software analyzer according to the present invention to such vehicle control software, the software components to be simultaneously reutilized or changed for development of derived products can be grouped, enabling a reduction in the number of sets. Furthermore, the user can efficiently select software components.

The present invention can be implemented by the program codes of software implementing the functions of the embodiment. In this case, a storage medium with the program codes recorded therein is provided in the system or apparatus. A computer (or a CPU or an MPU) in the system or apparatus reads the program codes stored in the storage medium. In this case, the program codes themselves read from the storage medium implement the functions of the above-described embodiment. Furthermore, the program codes themselves and the storage medium storing the program codes form the present invention. The storage medium for the supply of the program codes may be, for example, a floppy (registered trademark) disk, a CD-ROM, a DVD-ROM, a hard disk, an optical disk, a magnetooptic disk, a CD-R, a magnetic tape, a nonvolatile memory card, or a ROM.

Alternatively, an OS (Operating System) or the like operating on the computer may execute a part or all of the actual processing based on the instructions of the program codes, so as to implement the functions of the above-described embodiment. Moreover, after the program codes read from the storage medium are written to a memory on the computer, the CPU in the computer may execute a part or all of the actual processing based on the instructions of the program codes, so as to implement the functions of the above-described embodiment.

Alternatively, the program codes of the software implementing the functions of the embodiment may be distributed via a network and stored in storage means such as a hard disk or a memory of the system or apparatus, or a storage medium such as a CD-RW or a CD-R. Then, during use, the computer (or CPU or MPU) in the system or apparatus may read and execute the program codes stored in the storage means or the storage medium.

What is claimed is:

1. A software analyzing apparatus for analyzing a plurality of software components included in existing software products and correlations between the plurality of software components, the software analyzer comprising:
    product line analysis means for creating product line configuration data numerically expressing a set of the plurality of software components included in the existing software products, from existing product configuration data including, for each of the existing software products, data on the plurality of software components and data on the correlations between the plurality of software components;
    inter-component distance analysis means for calculating inter-software-component distances between a targeted software component and numerically quantified software components other than the targeted software component based on the product line configuration data;
    component cluster analysis means for grouping the software components based on the inter-software-component distances; and
    an output section outputting results obtained by the product line analysis means, the inter-component distance analysis means, and the component cluster analysis means.

2. The software analyzing apparatus according to claim 1, wherein the existing product configuration data comprises at least one of software component utilization data on software components included in the plurality of software components and utilized in the existing software product, version data on the software components included in the software component utilization data, original product data on an original product based on which the existing software product is developed, and software component data included in the original product data.

3. The software analyzing apparatus according to claim 2, wherein based on the existing product configuration data, the product line analysis means numerically converts the software component utilization data to create the product line configuration data and outputs the product line configuration data to a product line repository section.

4. The software analyzing apparatus according to claim 2, wherein based on the existing product configuration data, the product line analysis means numerically converts the original product data and software component data obtained by changing the software component data included in the original product data, to create the product line configuration data, and outputs the product line configuration data to the product line repository section.

5. The software analyzing apparatus according to claim 1, wherein based on the product line configuration data, the inter-component distance analysis means determines at least one of a Euclidean distance, a Manhattan distance, and an angle to obtain the inter-software-component distance, and outputs the inter-software-component distance to an inter-component distance repository section.

6. The software analyzing apparatus according to claim 1, wherein based on the inter-software-component distance, the component cluster analysis means creates software components for which the inter-software-component distance has at most a predetermined value, into the software component group, and outputs the software component group to a component cluster repository section.

7. The software analyzing apparatus according to claim 1, wherein the component cluster analysis means converts the inter-software-component distances into a tree diagram, and the output section displays the tree diagram.

8. The software analyzing apparatus according to claim 1, further comprising:
    software component selection means adapted to acquire, from the plurality of software components, data on the software components and version data on the software components and selecting software component candidates;
    a to-be-utilized software component repository section storing a software component which is included in the software component candidates displayed by the output section and which is selected by a user;
    software component retrieval means, based on the inter-software-component distances, retrieving a software component likely to be used together with the software component selected by the user, as a recommended software component; and
    a recommended software component repository section storing the recommended software component,
    wherein the output section further outputs results from the software component selection means, the to-be-utilized software component repository section, and the recommended software component repository section.

9. The software analyzing apparatus according to claim 8, wherein the output section displays the recommended software component together with the software component candidate.

10. The software analyzing apparatus according to claim 1 for vehicle control wherein the software components comprise:
    a plurality of basic software components configured to control a microprocessor or an LSI;
    a plurality of control software components processing at least one of sensor control, control object status estimation, control object target status determination, and actuator control,
    wherein the component cluster analysis means has at least one of a basic software component group comprising only the basic software components, a control software component group comprising only the control software components, and a crosscutting software component group including a mixture of the basic software components and the control software components.

11. A non-transitory recording medium which stores a program allowing a computer to function as the software analyzing apparatus according to claim 1.

* * * * *